United States Patent [19]

Jentsch et al.

[11] 4,253,683
[45] Mar. 3, 1981

[54] SAFETY-BLEED-STOP HOSE COUPLING

[76] Inventors: Donald G. Jentsch, 406 Salisbury, Victoria, Tex. 77901; Frank L. Ardoin, Rte. 5 Box 152 F, Victoria, Tex. 77901

[21] Appl. No.: 65,913

[22] Filed: Aug. 13, 1979

[51] Int. Cl.³ .................. F16L 21/02; F16L 55/00
[52] U.S. Cl. .................................... 285/13; 285/174; 285/376; 285/DIG. 25
[58] Field of Search ............... 285/13, DIG. 25, 376, 285/360, 401, 14

[56] References Cited

U.S. PATENT DOCUMENTS

| | | |
|---|---|---|
| 699,366 | 5/1902 | Bowes, Jr. .................. 285/360 X |
| 1,074,706 | 10/1913 | Ferguson ..................... 285/360 X |
| 1,093,528 | 4/1914 | Bowes, Jr. . |
| 1,580,694 | 4/1926 | Smith ...................... 285/DIG. 25 X |
| 2,613,089 | 10/1952 | Maiman ..................... 285/376 X |
| 3,162,470 | 12/1964 | Davidson et al. . |
| 3,574,359 | 4/1971 | Klein .............................. 285/86 |
| 3,929,357 | 12/1975 | DeVincent et al. ..... 285/DIG. 25 X |
| 3,933,378 | 1/1976 | Sandford et al. ........ 285/DIG. 25 X |
| 4,168,015 | 9/1979 | Robinette ............... 285/DIG. 25 X |

Primary Examiner—Thomas F. Callaghan

[57] ABSTRACT

A two-step disconnect hose coupling having a safety vent is disclosed. The coupling features a safety stop and bleed vent combination which restrains the coupling halves and produces a telltale warning before the coupling halves are completely separated. If there is pressure on the hose, the coupling halves are pushed apart thereby engaging the safety stop and allowing a telltale warning (vent bleed-off) to function. The bleed-off vent is enclosed within the coupling and is shielded by the female member when the coupling is in the safety stop position. Complete disconnection of the hose coupling requires two separate rotational movements of the coupling halves relative to each other, and if there is pressure on the hose, the coupling halves will be pushed apart after completion of the first rotation step and the telltale warning will be produced by high pressure discharge through the vent opening as the coupling halves are pushed apart. In a preferred embodiment, the hose coupling includes a female member having a pair of inwardly directed, oppositely disposed segmental lugs and a male member having first and second pairs of outwardly projecting, oppositely disposed segmental flanges adapted to overlap and slidably engage behind the segmental lugs when the tubular sidewall portion is inserted into the receptacle and the members are rotated relative to each other. The first and second pair of flanges are axially spaced and angularly displaced with respect to each other, and a vent opening is formed in the tubular sidewall portion which is sealed by the female member when the tubular sidewall portion is fully inserted, and which is unsealed to permit fluid discharge into the interior of the receptacle as the tubular sidewall portion is withdrawn from the position of sealing engagement toward the safety stop position.

2 Claims, 3 Drawing Figures

SAFETY-BLEED-STOP HOSE COUPLING

BACKGROUND OF THE INVENTION

1. Field of the Invention

This invention relates to hose couplings, and in particular to a safety disconnect high pressure coupling which features a dual detent structure which produces an audible warning of a high pressure line condition while simultaneously bleeding off the high pressure line prior to complete disconnection of the coupling halves.

2. Description of the Prior Art

In a number of important industrial applications, high pressure conduits are connected together by a suitable coupling, such as a quick connect coupling, to carry fluids under pressure from a high pressure source to a load. A typical application involves the use of compressed air as a source of energy for actuating a portable hand tool. In such an arrangement compressed air is delivered from a compressor through a flexible hose to the portable tool. The flexible hose is usually furnished in sections of various lengths, with the sections being coupled together by means of fittings or couplings. Additionally, the hose couplings are sometimes attached to a manifold member.

Because the compressed air line operates at relatively high pressures, for example at pressure levels in the range of 90 psi to 150 psi, if the coupling becomes accidentally disconnected, the hose line will be propelled by the compressed air as it escapes and will cause the hose to whip around in an uncontrollable manner which can cause serious personal injury.

A large number of accidents involving personal injury are caused by disconnecting a high pressure coupling without first bleeding off the line. High pressure hose lines are relatively heavy and unwieldly even when unpressurized so that it is sometimes difficult for an operator to determine if a line is pressurized. The line may be pressurized to a dangerous level even though the compressor to which it is connected is not operating. Therefore the disconnection of a hose coupling on a high pressure line can expose the operator or his co-workers to the risk of serious personal injury if the line is disconnected without first bleeding off or otherwise its pressure. Because high pressure lines are sometimes handled by inexperienced operators, and are sometimes stiff or relatively inflexible so that even an experienced operator cannot determine in advance whether or not the line is pressurized, and because of the serious risk of personal injury associated with the inadvertent or improper disconnection of a high pressure line, there is a continuing interest in improving high pressure hose couplings so that disconnection of a high pressure line can be carried out safely and quickly even by an inexperienced operator.

SUMMARY OF OBJECTS OF THE INVENTION

It is, therefore, the principal object of the present invention to provide a fluid conduit coupling suitable for use in a high pressure line which can be safely and rapidly disconnected, even by an inexperienced operator.

Another object of the invention is the provision of a readily connected and disconnected high pressure hose coupling for systems containing fluids under pressure which may be released partially to bleed off fluid pressure before being completely disconnected.

Yet another object of the invention is to provide a simple, economical and safe conduit coupling for use in a high pressure fluid conduit which may be readily disconnected without the use of special tools and which has an intermediate vent position in which the pressure may bleed off but the coupling halves will not be forcibly disconnected by the pressure in the line.

A further object of the invention is to provide a simple and reliable conduit coupling which produces an audible warning that the line is pressurized and which can be partially disengaged to bleed off fluid pressure and thereafter may be fully disengaged to separate the coupling members.

SUMMARY OF THE INVENTION

The foregoing objects are achieved by a two-step disconnect hose coupling having a safety vent. The coupling includes male and female coupling members having a safety stop and bleed vent combination which restrains the coupling halves and produces a telltale warning before the coupling halves are completely separated. If there is pressure in the line, the coupling members are pushed apart to the safety stop position thereby engaging the safety stop and allowing the telltale warning (vent bleed-off) to function. The bleed-off vent is enclosed within the coupling and is shielded by the female member when the coupling is in the safety stop position. Complete disconnection of the hose coupling requires two separate rotational movements of the coupling halves relative to each other, and if the line is pressurized, the coupling halves will be pushed apart after completion of the first rotation step and the telltale warning will be produced by discharge through the vent opening as the coupling halves are pushed apart toward the safety stop position.

In a preferred embodiment, the hose coupling includes a female member having a pair of inwardly directed, oppositely disposed segmental lugs which define a restricted keyway and a male member having first and second pairs of outwardly projecting, oppositely disposed segmental flanges adapted to overlap and slidably engage behind the segmental lugs when the tubular sidewall portion is inserted into the receptacle and the members are rotated relative to each other. The first and second pairs of flanges are axially spaced and angularly displaced with respect to each other. The male members includes a tubular sidewall portion having a vent opening which is sealed by the female member when the tubular sidewall portion is fully inserted, and which is uncovered to permit fluid into the interior of the receptacle as the tubular sidewall portion is withdrawn from the position of sealing engagement toward the safety stop position.

The foregoing and other related objects and advantages of the present invention will become more apparent from the following specification, claims and appended drawings wherein:

DESCRIPTION OF THE PREFERRED EMBODIMENT

Figures 1, 2, 3:
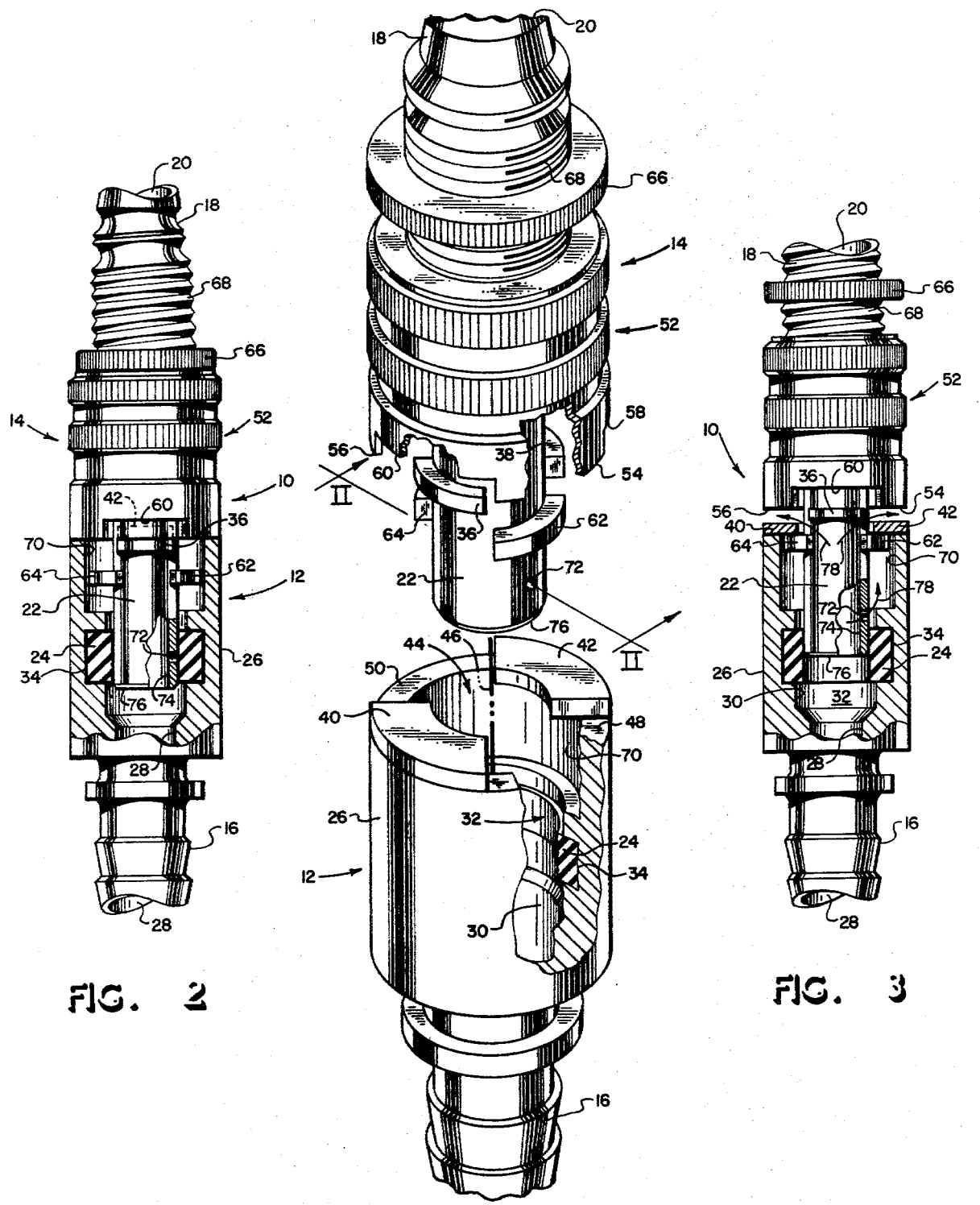
FIG. 1 is an exploded, perspective view, partly broken away and partly in section, of the male and female coupling members of the invention.
FIG. 2 is an elevation view, partly in section, showing the male and female coupling members in the assembled, locked position; and, FIG. 3 is an elevation view, partly in section, which shows the male and female coupling members in the partially disconnected, safety-stop position.

In the description which follows, like parts are marked throughout the specification and drawings with the same reference numerals, respectively. The figures are not necessarily drawn to scale and in some instances portions have been exaggerated in order to more clearly depict certain features of the invention.

Referring now to FIGS. 1 and 2 of the drawing, the high pressure safety coupling assembly of the invention is represented generally by the reference numeral 10. The safety coupling assembly 10 comprises as its principal components a tubular female coupling member 12 which is adapted to mate with a tubular male coupling member 14. The male coupling member 14 is reciprocally received within the female member 12 to couple two conduits (not shown) together. These conduits may be, for example, high pressure flexible hoses, one being attached to a portable tool (not shown), and the other being attached to a high pressure fluid source such as a tank of compressed air or an air compressor (not shown). The female coupling member 12 has a ribbed shank portion 16 and the male coupling member 14 has a ribbed shank portion 18 to which the flexible hoses are connected in a fluid-tight union by suitable mechanical means such as a crimping band (not illustrated).

The male coupling member 14 is provided with an axially extending bore 20 which defines a fluid flow passage. Projecting from the opposite end of the male coupling member is a coupling sleeve 22 which is adapted to be inserted into the female coupling member 12 and into sealing engagement with an annular sealing element 24 carried by the female coupling member.

The female coupling member 12 is characterized by a cylindrical housing 26 through which an axially extending bore 28 defines a fluid flow passage. The bore 28 is enlarged by a counterbore 30 which defines a sealing chamber 32. Machined within the counterbore 30 is an annular recess 34 in which the sealing element 24 is lodged. The coupling sleeve 22 is adapted to be gripped by the annular sealing element 24 in a resilient interference fit as it is inserted into the sealing chamber 32. This provides a fluid-tight union between the male and female coupling members 12, 14.

The fluid-tight engagement of the male and female coupling members is retained by a pair of outwardly extending, diametrically opposite segmental flanges or pressure stops 36, 38 which are disposed for mating relationship with a pair of inwardly directed, diametrically oppositely disposed, segmental lugs 40, 42 which are carried on the end of the female cylindrical housing 26. As can best be seen in FIG. 1, the segmental lugs 40, 42 partially block the entrance to the sealing chamber 32 and define a restricted keyway opening 44 through which the pressure stops 36, 38 can be inserted only when they are properly aligned. Alignment of the pressure stops 36, 38 with the keyway opening 44 is carried out simply by rotating the male member until the flanges line up with the restricted keyway opening as shown in FIG. 3.

Referring again to FIG. 1, the segmental lugs 40, 42 overlie the entrance to the sealing chamber 32 and project radially inwardly towards the axis 46 of the female coupling member. Between the segmental lugs 40, 42 on either side, the cylindrical housing 26 is recessed to provide a pair of diametrically opposite seats 48, 50. To lock the male and female coupling members in mated relationship, a spring loaded locking collar 52 is slidably mounted on the male coupling member 14. The locking collar 52 is formed with a pair of forwardly extending, diametrically opposed projections 54, 56 between which are seats 58, 60. The locking projections 54, 56 and recesses 58, 60 are adapted to interengage with the top surfaces of the segmental lugs 40, 42 and the recesses 48, 50. As previously stated, the locking collar 52 is spring loaded and continuously applies a bias force which holds the male coupling sleeve 22 in its position of sealing engagement with the sealing element 24 as shown in FIG. 2.

A second pair of outwardly extended, diametrically opposed segmental flanges or safety stops 62, 64 serve as safety detent means and project from the surface of the male coupling sleeve 22. The safety stops 62, 64 are axially spaced and angularly displaced with respect to the pressure stops 36, 38. Accordingly to this arrangement, two distinct rotational movements must be carried out to completely withdraw the pressure stops and the safety stops through the restricted keyway 44. The safety stops are preferably angularly spaced with respect to the pressure stops by approximately a right angle. However, the pressure stops and safety stops may be overlapping if desired. After the male coupling member has been fully inserted into the female coupling member as shown in FIG. 2, the spring loaded locking collar 52 is secured in place by advancing a threaded locking ring 66 along a threaded portion 68 of the shank 18 and applying torque thereto until the spring loaded locking collar is firmly secured in place.

The sealing chamber 32 is enlarged by a counterbore 70 which defines a receptacle for receiving the pressure stops 36, 38 and safety stops 62, 64. The receptacle 70 also serves as a vent chamber as will be pointed out more particularly hereinafter.

According to an important feature of the invention, a vent opening 72 is formed in the sidewall 74 of the male coupling sleeve 22. The vent opening 72 extends radially through the sidewall 74 and is spaced from the end of the male coupling sleeve 22 so that the vent opening 72 is sealed by the sealing element 24 when the male coupling sleeve 22 is fully inserted, as shown in FIG. 2, but which is unsealed to permit fluid discharge into the vent chamber 70 as the male coupling sleeve 22 is withdrawn from the position of sealing engagement, as shown in FIG. 3. The vent opening is preferably a small cylindrical bore but other configurations such as a slot may be used to good advantage. If a slot is used, it may be extended from the lip 76 of the male coupling sleeve for a predetermined axial distance along the coupling sleeve whereby the area of the discharge opening increases as the male coupling sleeve 22 is withdrawn from the position of sealing engagement.

Referring now to FIG. 3, the safety coupling assembly 10 is prepared for disconnection by backing off the locking ring 66 and turning the male coupling member 14 until the pressure stops 36, 38 are in alignment with the restricted keyway opening 44. If the line is pressurized, the male coupling sleeve 22 will be driven through the restricted keyway opening 44 until the safety stops 62, 64 are driven into safety locking engagement with the underside of the segmental lugs 40, 42. As the male coupling sleeve 22 is withdrawn from the position of sealing engagement, the vent opening 72 is uncovered to permit fluid discharge into the vent chamber 70 as indicated by the arrows 78. The rapidly escaping air generates a telltale warning sound as it escapes into the vent chamber 70 and through the restricted keyway opening 44. The force of the escaping air is shielded by the cylindrical housing 26 so that it causes no harm as it is vented. The telltale warning sound diminishes in intensity as the pressure in the line is relieved, thereby providing an indication that it is safe to complete the disconnection of the coupling assembly. The disconnection is completed by rotating the male coupling member 14 through approximately 90° to bring the safety stops 62, 64 into alignment with the restricted keyway opening 44 and then completely withdrawing the male coupling sleeve 22 from the combination locking and vent chamber 70.

It is apparent from the foregoing description that an improved hose coupling has been provided which requires two separate rotation steps for complete disconnection, and which provides a warning sound indicating the presence of a high pressure condition in the line while safely venting that high pressure condition upon completion of the first disconnection step. Because the pressure stops and safety stops are angularly spaced with respect to each other, two separate rotational steps must be performed for complete disconnection. In carrying out this operation, two hand movements are required and the hand must be repositioned between these separate movements, thereby providing a very necessary pause before the assembly is placed in a potentially dangerous condition. If there is pressure on the hose, the male and female coupling members will be pushed apart upon completion of the first rotation step, thereby engaging the safety stops and allowing the telltale warning to function. This coupling arrangement is a significant improvement over the prior art because it provides a telltale warning before the coupling halves are separated. Additionally, the high pressure condition is vented safely and complete separation is performed without the use of special tooling.

It will be apparent that the invention may be embodied in other specific forms without departing from the spirit or essential characteristics thereof. Thus the present embodiment should therefore be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A fluid conduit coupling comprising a female member defining a receptacle and a male member having a tubular sidewall portion slidably received in the receptacle and engagable in sealing relation with the female member when inserted therein, said female member having a pair of inwardly directed, oppositely disposed segmental lugs at one end thereof, said segmental lugs being angularly spaced with respect to each other thereby defining a keyway, said tubular sidewall portion having a first pair of outwardly projecting, oppositely disposed segmental flanges for insertion into the keyway and to overlap and slidably engage behind said segmental lugs when said tubular sidewall portion is inserted into the receptacle and said members are rotated relative to each other, a second pair of outwardly projecting oppositely disposed segmental flanges axially spaced and angularly offset with respect to said first flange pair, said second pair of flanges being adapted for insertion into the keyway and to overlap and slidably engage behind said segmental lugs when said male member is inserted further into said receptacle and said members are rotated relative to each other, said female member having a bore communicating with the keyway defining a passage permitting unrestricted axial displacement of said male member and said segmental flanges between a position of sealing engagement and a safety stop position, and the tubular sidewall portion of said male member having a vent opening which is sealed by said female member when said tubular sidewall portion is fully inserted, and which is unsealed to permit fluid discharge into the passage as said tubular sidewall portion is withdrawn from the position of sealing engagement.

2. A safety-bleed-stop hose coupling assembly comprising, in combination:
a tubular female member having an axially extending bore defining a fluid flow passage, an annular resilient sealing element lodged in said bore and circumscribing the fluid flow passage, a shank projecting from one end thereof for attachment to one end of a hose, and a pair of inwardly directed diametrically oppositely disposed segmental lugs formed on the opposite end of said female member partially blocking the flow passage and defining a restricted keyway opening;
a tubular male member having an axially extending bore defining a fluid flow passage, a shank projecting from one end of said male member for attachement to one end of a hose, a coupling sleeve having a tubular sidewall portion projecting from the opposite end of said male member for insertion into said female member and into sealing engagement with said annular sealing element, said coupling sleeve having a vent opening extending radially through the sidewall portion defining a by-pass flow passage which is sealed by said annular sealing element when said sleeve is in the position of sealing engagement and which is uncovered when said sleeve is at least partially withdrawn from the position of sealing engagement, and said sleeve having a first pair of outwardly projecting, diametrically oppositely disposed segmental flanges which are adapted for insertion through the restricted keyway opening and to overlap and slidably engage behind said segmental lugs when said first pair of segmental flanges are inserted into said locking chamber and said members are rotated relative to each other, and a second pair of outwardly projecting, diametrically oppositely disposed segmental flanges which are adapted for insertion through the restricted keyway opening and to overlap and slidably engage behind said segmental lugs in a safety stop position when said second pair of segmental flanges are inserted through the restricted keyway opening and said members are rotated relative to each other, said second pair of segmental flanges being axially spaced and angularly offset with respect to the first flange pair; and,
the axially extending bore having a counterbore communicating with the keyway opening and defining a passage permitting unrestricted axial displacement of the male member and segmental flanges between the position of sealing engagement and the safety stop position, wherein the vent opening is in communication with the second counterbore when the first pair of segmental flanges are in the safety stop position.

* * * * *

UNITED STATES PATENT AND TRADEMARK OFFICE
CERTIFICATE OF CORRECTION

PATENT NO. : 4,253,683

DATED : March 3, 1981

INVENTOR(S) : Donald G. Jentsch and Frank L. Ardoin

It is certified that error appears in the above—identified patent and that said Letters Patent is hereby corrected as shown below:

Column 1, Line 45-46, between the words "otherwise" and "its", please add — reducing —

Column 2, Line 33, "warming" should be "warning"

Claim 2, Column 6, Line 28, "attachement" should be "attachment"

Signed and Sealed this

Second Day of June 1981

[SEAL]

Attest:

RENE D. TEGTMEYER

Attesting Officer

Acting Commissioner of Patents and Trademarks